United States Patent
Nagano (10) Patent No.: US 11,478,922 B2
(45) Date of Patent: Oct. 25, 2022

(54) ROBOT TEACHING DEVICE AND ROBOT SYSTEM

(71) Applicant: FANUC CORPORATION, Yamanashi (JP)

(72) Inventor: Keisuke Nagano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 237 days.

(21) Appl. No.: 16/891,071

(22) Filed: Jun. 3, 2020

(65) Prior Publication Data

US 2020/0398420 A1     Dec. 24, 2020

(30) Foreign Application Priority Data

Jun. 21, 2019   (JP) .............................. JP2019-115464

(51) Int. Cl.
*B25J 9/16* (2006.01)
*B25J 9/00* (2006.01)
*B25J 13/06* (2006.01)
*B25J 13/08* (2006.01)

(52) U.S. Cl.
CPC .......... *B25J 9/0081* (2013.01); *B25J 9/1697* (2013.01); *B25J 13/06* (2013.01); *B25J 13/08* (2013.01)

(58) Field of Classification Search
CPC ........ B25J 9/0081; B25J 9/1697; B25J 9/163; B25J 9/1664; B25J 13/06; B25J 13/08; G05B 2219/40116; G05B 19/423; G05B 19/427; Y10S 901/01; Y10S 901/03
USPC ........................... 700/245, 257, 259; 901/1, 3
See application file for complete search history.

(56) References Cited

U.S. PATENT DOCUMENTS

| | | | | |
|---|---|---|---|---|
| 7,714,895 B2* | 5/2010 | Pretlove | ................. | B25J 9/1656 348/222.1 |
| 2014/0022171 A1* | 1/2014 | Yanai | ...................... | G06F 3/017 345/158 |
| 2015/0051735 A1* | 2/2015 | Tanaka | ................... | B25J 9/1638 700/262 |
| 2015/0314442 A1* | 11/2015 | Boca | ...................... | B25J 9/1664 700/259 |
| 2016/0016308 A1* | 1/2016 | Kanazawa | ............. | B25J 9/1607 700/263 |

FOREIGN PATENT DOCUMENTS

WO     2017130389 A1     8/2017

* cited by examiner

*Primary Examiner* — Dalena Tran
(74) *Attorney, Agent, or Firm* — Hauptman Ham, LLP (57) ABSTRACT

A robot teaching device includes: an image acquisition device configured to acquire, as a moving image, a distance image representing distance information of an imaging object, or a two-dimensional image of the imaging object; a trajectory detection section configured to detect a movement trajectory of an operator's hand depicted as the imaging object in the moving image by using the moving image; an identification section configured to identify whether the detected movement trajectory represents a linear movement or a rotational movement; and a command generation section configured to output a command for translating a predetermined movable part of the robot based on the movement trajectory when the movement trajectory is identified as representing a linear movement, and to output a command for rotating the predetermined movable part based on the movement trajectory when the movement trajectory is identified as representing a rotational movement.

5 Claims, 9 Drawing Sheets

LINEAR MOVEMENT

FIG. 5

ROTATIONAL MOVEMENT

ROBOT TEACHING DEVICE AND ROBOT SYSTEM

RELATED APPLICATIONS

The present application claims priority to Japanese Application Number 2019-115464, filed Jun. 21, 2019, the disclosure of which is hereby incorporated by reference herein in its entirety.

BACKGROUND OF THE INVENTION

1. Field of the Invention

The present invention relates to a robot teaching device and a robot system.

2. Description of the Related Art

When performing various tasks with a system using an industrial robot, it is necessary to teach the robot so that the robot performs an intended operation. The teaching device of an industrial robot generally has operation keys or an operation screen by which a jog operation can be performed. On the other hand, as another example of a teaching device, WO 2017/130389 describes "A robot teaching device, which is provided with an image input device for acquiring an image in which a finger of an operator and an object to be worked are depicted, a finger motion detection section for detecting the motion of the operator's finger from the image acquired by the image input device, and an operation estimation section for estimating the operation of the operator to the object to be worked from the motion of the finger detected by the finger motion detection section, in which a control program generation section generates a control program for the robot to reproduce the operation estimated by the operation estimation section" (paragraph 0006).

SUMMARY OF THE INVENTION

In teaching an industrial robot using a teaching device, a teaching method using jog operation keys of the teaching device or a touching/sliding operation to a screen of the teaching device is often used. However, in teaching by operating the jog operation keys, the degree of freedom of instruction is limited by the number of jog operation keys, and in teaching by touching/sliding operation of the screen, the degree of freedom of instruction is limited to a two-dimensional plane. There is a need for a robot teaching device and a robot system that have a higher degree of freedom and can teach a robot with an intuitive operation.

An aspect of the present disclosure is a robot teaching device for teaching a robot, which includes: an image acquisition device configured to acquire, as a moving image, a distance image representing distance information of an imaging object, or a two-dimensional image of the imaging object; a trajectory detection section configured to detect a movement trajectory of an operator's hand depicted as the imaging object in the moving image by using the moving image; an identification section configured to identify whether the detected movement trajectory represents a linear movement or a rotational movement; and a command generation section configured to output a command for translating a predetermined movable part of the robot based on the movement trajectory when the movement trajectory is identified as representing a linear movement, and to output a command for rotating the predetermined movable part of the robot based on the movement trajectory when the movement trajectory is identified as representing a rotational movement.

Another aspect of the present disclosure is a robot system, which includes a robot, a robot controller configured to control the robot, and the robot teaching device, in which the robot controller controls the robot based on the command output by the command generation section of the robot teaching device.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Embodiments of the present disclosure will be described below with reference to the accompanying drawings. Throughout the drawings, corresponding components are denoted by common reference numerals. In order to facilitate understanding, the scale of these drawings is appropriately changed. Moreover, the embodiments illustrated in the drawings are examples for implementing the present invention, and the present invention is not limited to the embodiments illustrated in the drawings.

Figure 1:
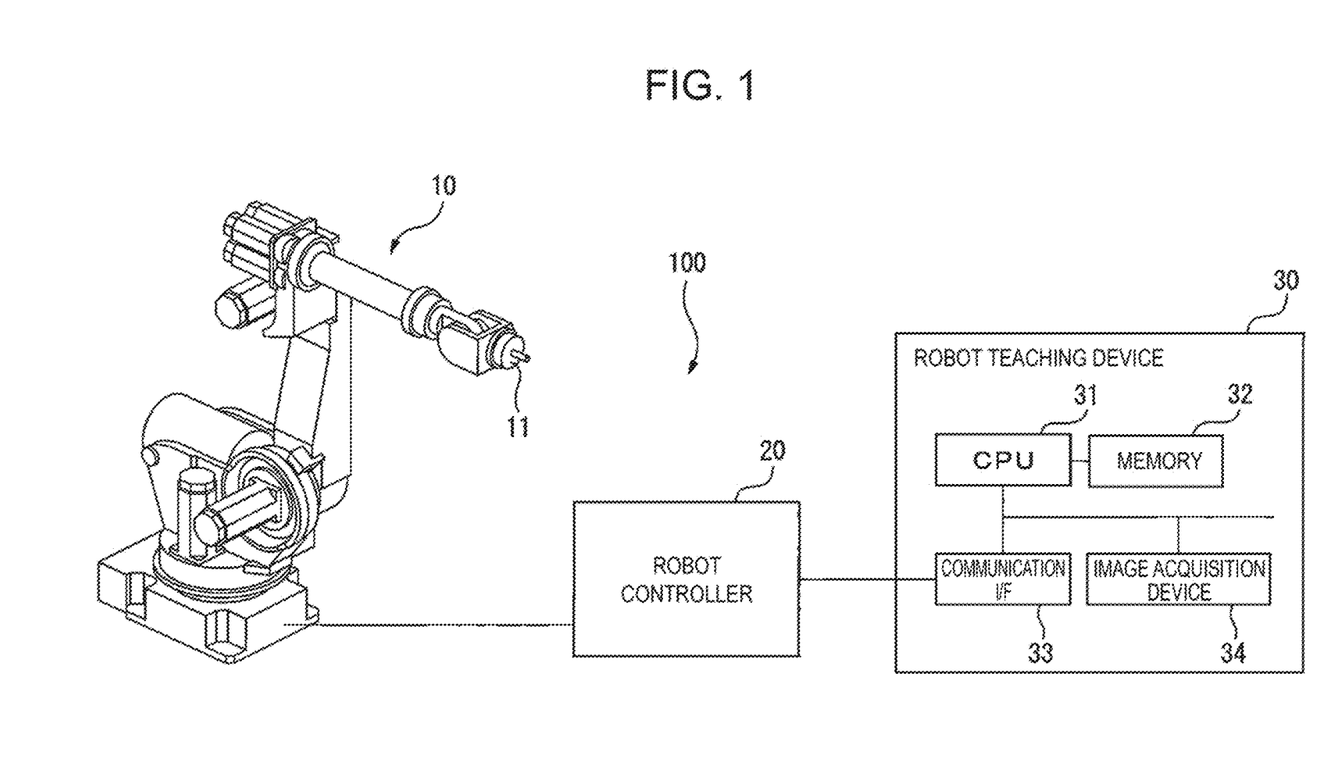
FIG. 1 is a diagram illustrating the overall configuration of a robot system including a robot teaching device according to an embodiment.
Figure 2:
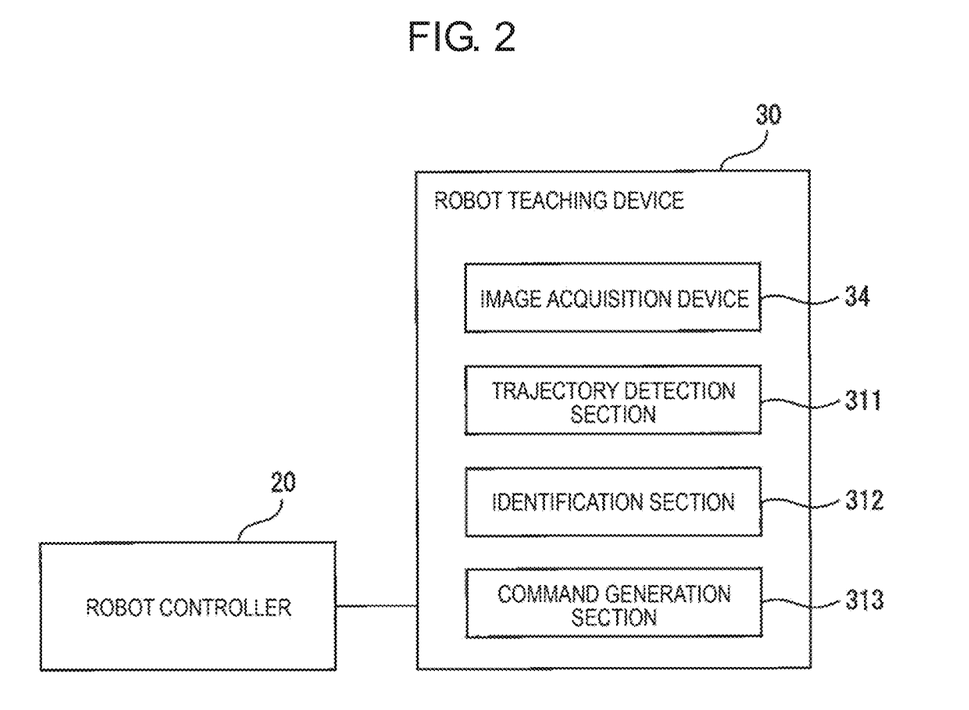
FIG. 2 is a functional block diagram illustrating the functions of the robot teaching device.

FIG. 1 is a diagram illustrating the overall configuration of a robot system 100 including a robot teaching device 30 according to an embodiment. FIG. 2 is a functional block diagram illustrating the functions of the robot teaching device 30. As illustrated in FIG. 1, the robot system 100 includes a robot 10, a robot controller 20 configured to control the robot 10, and a robot teaching device 30 configured to teach the robot 10. The robot 10 is, for example, a vertical articulated robot, but other types of robots may be used. The robot controller 20 controls the operation of the robot 10 by controlling motors of axes of the robot 10. The robot controller 20 may have a configuration as a general computer including a CPU, a ROM, a RAM, a storage device, a display section, an operation section, a communication section, etc.

The robot teaching device 30 is, for example, a teach pendant or a tablet terminal type teaching device, and has a configuration as a general computer including a CPU 31, a memory 32 such as a ROM and a RAM, a communication interface 33, etc., as hardware components. The robot teaching device 30 is connected to the robot controller 20 via the communication interface 33. The robot teaching device 30 includes, as a user interface for teaching, an operation section 35 including various operation keys, and a display section 36 (refer to FIG. 3). The robot teaching device 30 according to the present embodiment further includes an image acquisition device 34 configured to image a hand of an operator performing a gesture input.

The image acquisition device 34 is a distance image camera configured to acquire, as a moving image, a distance image representing distance information depending on a spatial position of an imaging object, or a camera configured to acquire a two-dimensional image of an imaging object as a moving image. As an example, the image acquisition device 34 as a distance image camera may include a light source, a projector configured to project a pattern light, and two cameras arranged on both sides of and sandwiching the projector. The image acquisition device 34 may acquire the three-dimensional position information of the object by a stereo method by imaging the object, on which the pattern light is projected, from the two cameras arranged at the different positions. Alternatively, the image acquisition device 34 as a distance image camera may be a time of flight (TOF) type camera including a light source and an image sensor, and measuring the time ranging from when the light hits an object to when it returns. Alternatively, the image acquisition device 34 as a distance image camera may be a stereo camera having a configuration in which the position of the object is recognized by image recognition in each of the images captured by two cameras and then the three-dimensional position information of the object is acquired by a stereo method. Further, other types of devices may be used as the distance image camera. In the configuration example illustrated in FIG. 1 to FIG. 3, the image acquisition device 34 is configured as a device of a type incorporated in the robot teaching device 30, but the image acquisition device 34 may be configured as an external device connected to the robot teaching device 30 by wire or wireless.

Figure 3:
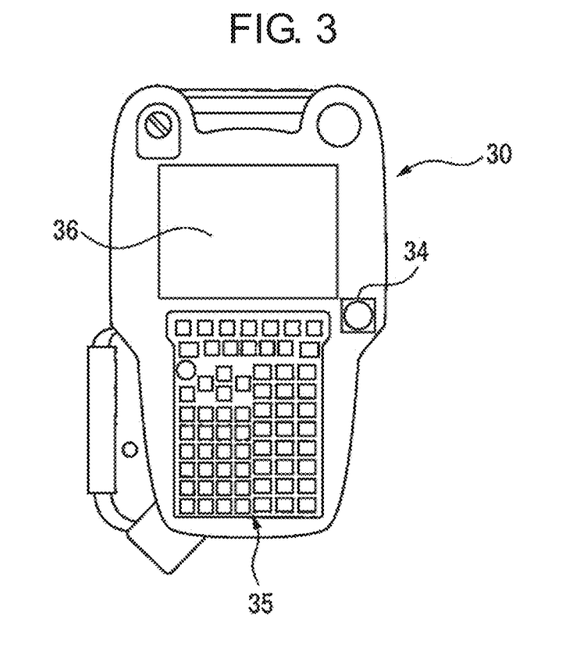
FIG. 3 is a diagram illustrating an example of the configuration of the front surface of the robot teaching device when the robot teaching device is configured as a teach pendant.
Figure 4:
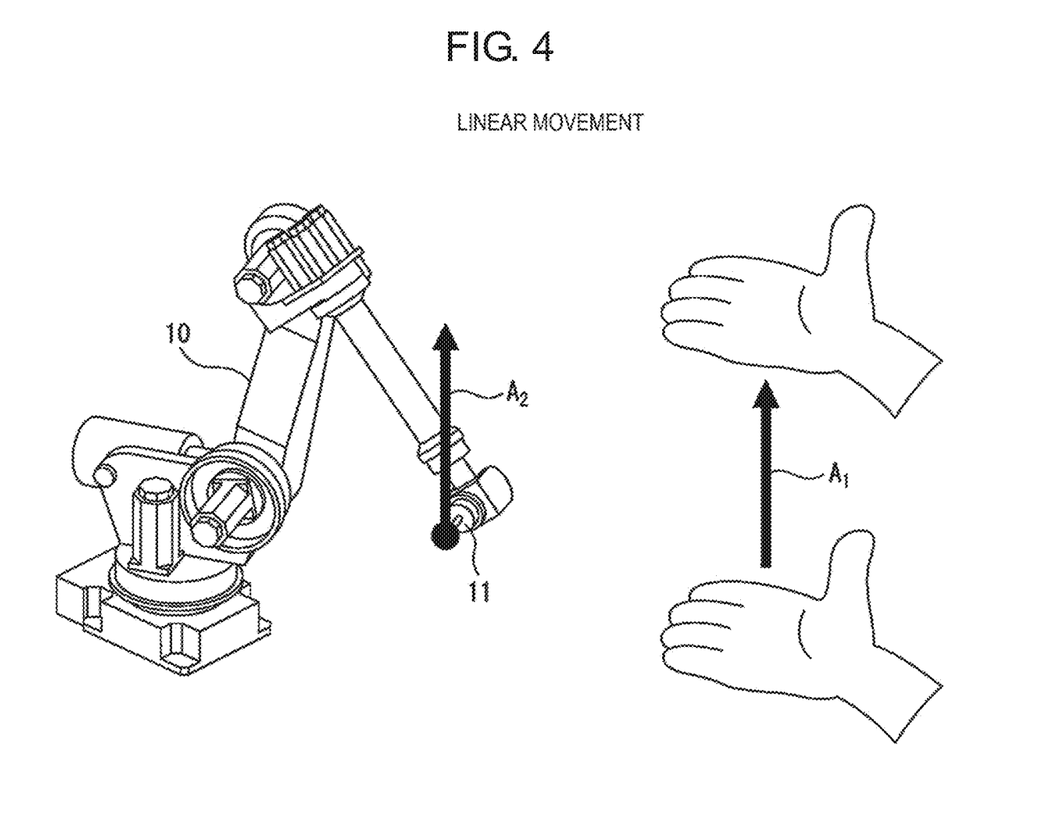
FIG. 4 is a schematic diagram illustrating a state in which a gesture input expressing linear movement is performed.
Figure 5:
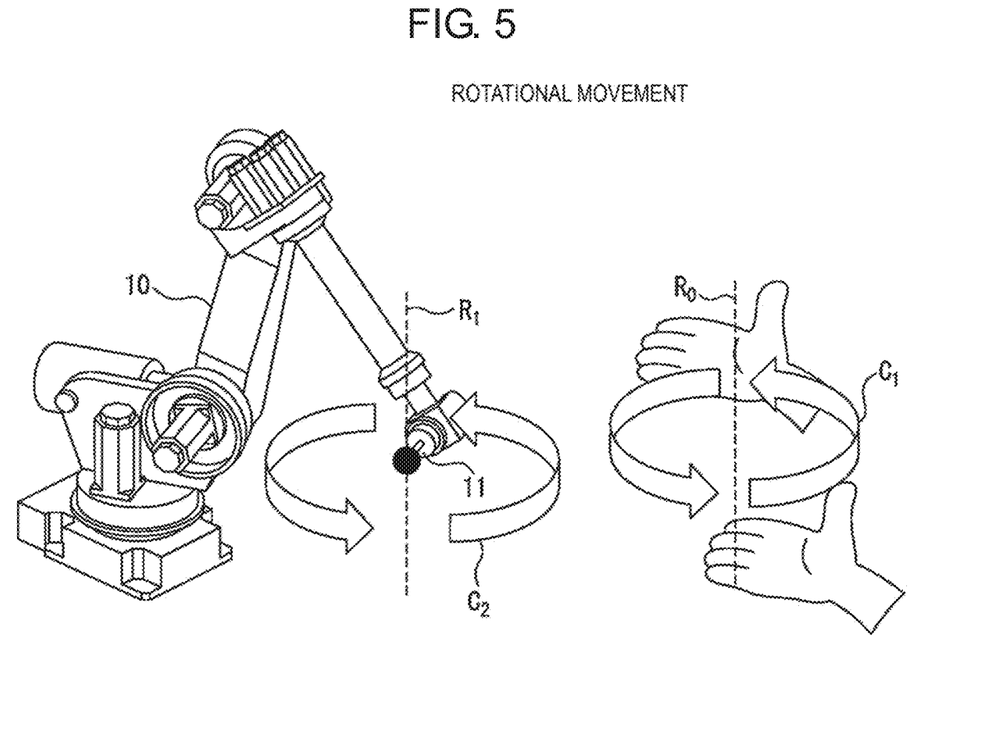
FIG. 5 is a schematic diagram illustrating a state in which a gesture input expressing a rotational movement is performed.

FIG. 3 illustrates a configuration example of the front surface of the robot teaching device 30 when the robot teaching device 30 is configured as a teach pendant. As illustrated in FIG. 3, the image acquisition device 34 is disposed on the front surface of the robot teaching device 30 where the operation section 35 and the display section 36 are disposed, and images an imaging object from the front surface side. In this configuration, the operator can hold the robot teaching device 30 with one hand and perform a gesture input by moving the other hand. As will be described in detail below, the robot teaching device 30 translates a predetermined movable part of the robot 10 when the movement of the operator's hand is a linear movement (refer to FIG. 4), and rotates the predetermined movable part of the robot 10 when the movement of the operator's hand is a rotational movement (FIG. 5). Hereinafter, as an example, it is assumed that the predetermined movable part is an arm tip 11 of the robot 10.

As illustrated in FIG. 2, the robot teaching device 30 includes, in addition to the image acquisition device 34, a trajectory detection section 311, an identification section 312, and a command generation section 313. These functions are implemented, for example, by the CPU 31 executing software stored in the memory 32. By using a moving image acquired by the image acquisition device 34, the trajectory detection section 311 detects a movement trajectory of an operator's hand depicted as an imaging object in the moving image. The identification section 312 identifies whether the detected movement trajectory of the hand represents a linear movement or a rotational movement. The command generation section 313 outputs a command for translating the arm tip 11 of the robot 10 based on the movement trajectory when the movement trajectory is identified as representing a linear movement (refer to FIG. 4), and outputs a command for rotating the arm tip 11 of the robot 10 based on the movement trajectory when the movement trajectory is identified as representing a rotational movement (refer to FIG. 5). The robot controller 20 controls the robot 10 according to a command from the robot teaching device 30.

Figure 6:
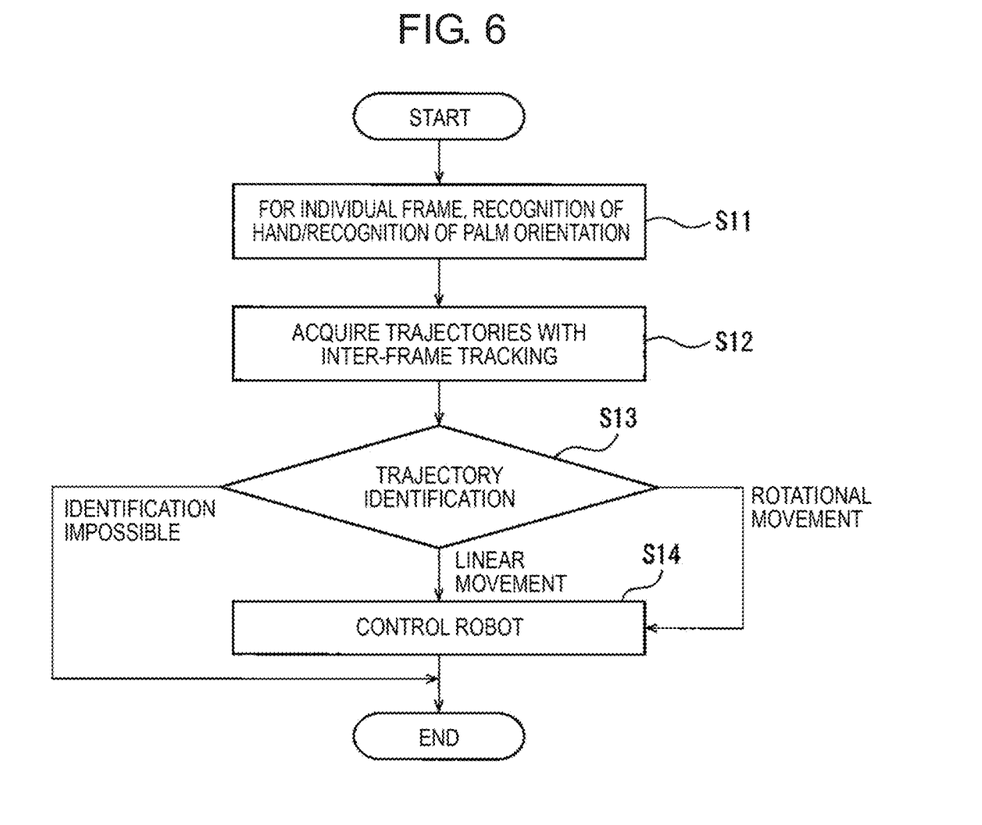
FIG. 6 is a flowchart illustrating a gesture teaching process.

FIG. 6 is a flowchart illustrating a teaching process (hereinafter, referred to as a gesture teaching process) by a gesture. The gesture teaching process of FIG. 6 is started, for example, by performing a predetermined operation on the robot teaching device 30 through the operation section 35. The gesture teaching process is executed under the control of the CPU 31 of the robot teaching device 30. When the gesture teaching process is started, imaging by the image acquisition device 34 is performed. When performing gesture input, it is assumed that the operator performs an operation while taking into consideration that only the hand portion of the operator is depicted in the image acquired by the image acquisition device 34 and that other portions such as the face are not depicted.

First, the robot teaching device 30 (trajectory detection section 311) recognizes a hand in individual frames of a moving image acquired by the image acquisition device 34 (step S11). For each of the case where the image acquisition device 34 is a distance image camera and the case where the image acquisition device 34 is a two-dimensional camera, the recognition of the hand on a frame-by-frame basis will be described.

(Step S11: In the Case of a Distance Image Camera)

In the image of each frame captured by the distance image camera, the distance to the imaging object is represented, for example, as a density. The operator's hand can be regarded as pixels (i.e., a set of pixels whose distances between adjacent pixels do not vary much) gathered as a lump within a certain distance range in a distance image. Therefore, by labeling pixels within a certain distance range in the distance image, the set of labeled pixels can be recognized as a hand. It should be noted that, by performing image recognition by this method under the condition that the operator moves his/her hand at a certain distance (e.g., about 15 cm) from the image acquisition device 34, the accuracy of recognition can be improved.

(Step S11: In the Case of a Two-Dimensional Camera)

When the image acquisition device 34 is a camera for acquiring a moving image of a two-dimensional image, the trajectory detection section 311 can recognize a hand by any of the following methods.

(A1) Recognizing a hand by grouping skin color pixels in an image. In this case, the skin color region can be extracted with high accuracy by converting the color information of the image from RGB to, for example, HSV (i.e., hue, saturation, and value) to extract the skin color region.

(A2) Performing image recognition by deep learning. As an example, a convolutional neural network is made to learn a large number of hand images in advance, and the hand is recognized in the image of each frame. In this case, for example, under the condition that the operator performs a gesture input in which his/her palm is open, images of the hands of a large number of persons with their palms open may be prepared as training data for learning.

(A3) Recognizing a hand by template matching. In this case, template matching may be performed under the condition that the operator performs a gesture input in a predetermined posture (e.g., an open palm).

The recognition of the palm orientation in step S11 will be described later.

When the hand is recognized for each individual frame in this manner, the trajectory detection section 311 then tracks the movement of the hand between the frames and acquires the trajectory of the hand (step S12). In step S12, the trajectory detection section 311 determines the centroid of the hand recognized for each individual frame. Here, various methods can be used for acquiring the geometric centroid of the hand based on the two-dimensional position information of the hand recognized in step S11. The trajectory detection section 311 acquires the movement trajectory of the hand by connecting the positions of the centroids of the hand in each of the acquired frames. For each of the case where the image acquisition device 34 is a distance image camera and the case where the image acquisition device 34 is a two-dimensional camera, the acquisition of the movement trajectory of the hand will be described.

(S12: In the Case of a Distance Image Camera)

When the distance image is used, since the pixels of the hand region recognized in step S11 have the distance information, it is possible to acquire the three-dimensional position of the centroid of the hand. Therefore, in this case, the trajectory detection section 311 acquires the three-dimensional position information of the movement trajectory of the hand by connecting the centroids of the hand recognized for individual frames.

(S12: In the Case of a Two-Dimensional Camera)

By connecting the positions of the centroid of the hand recognized in the two-dimensional images of individual frames, two-dimensional information of the movement trajectory of the hand can be acquired. In order to acquire three-dimensional information of the movement trajectory of the hand by using a two-dimensional camera, for example, a gesture input is performed under the following conditions.

Figure 9:
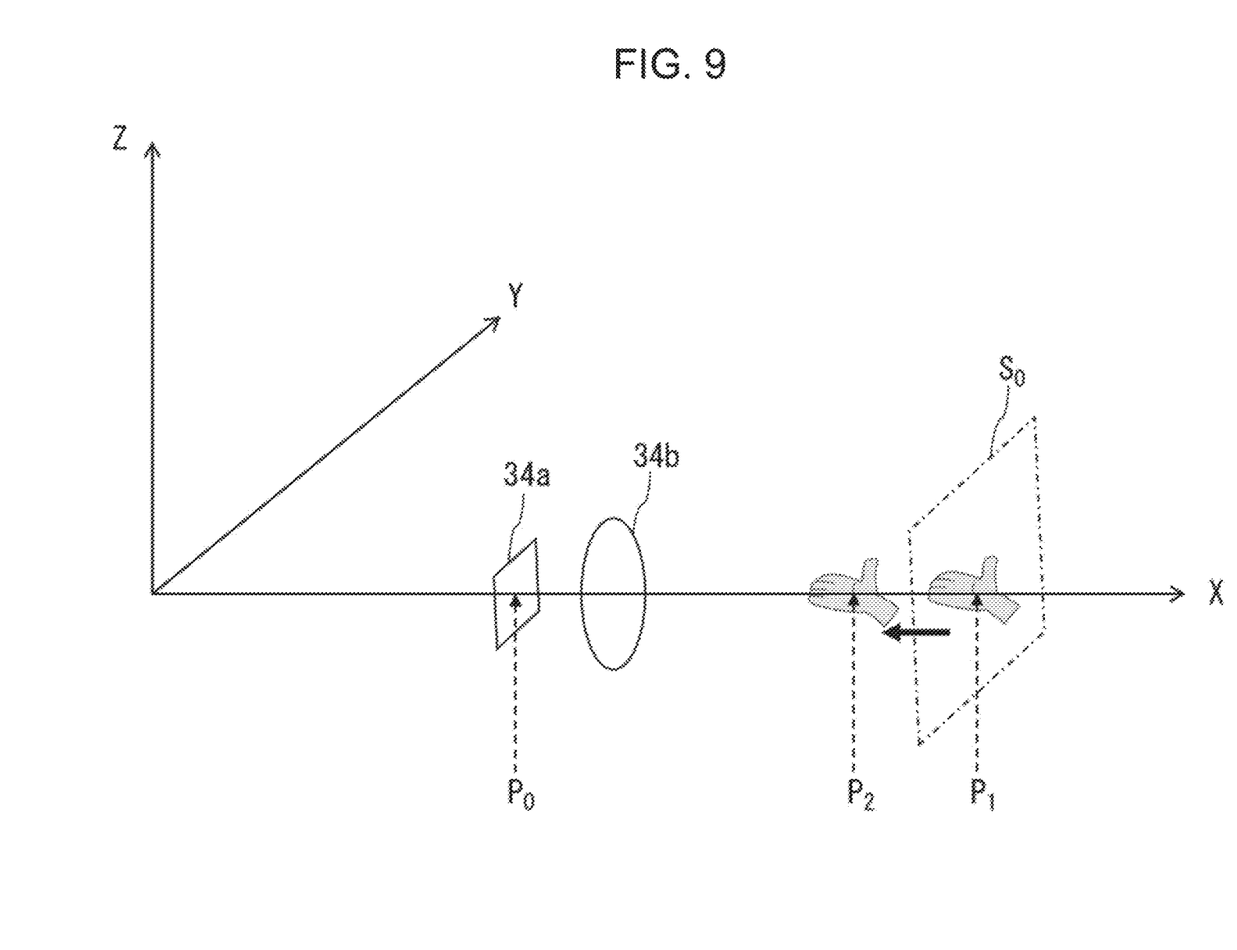
FIG. 9 is a schematic diagram illustrating an arrangement relation of an imaging plane, a lens, a reference plane, and a hand when three-dimensional position information of the hand is acquired using a two-dimensional image.

(r1) The operator holds the robot teaching device 30 at a known position in the robot coordinate system in such an orientation that the optical axis of a lens 34$b$ of the image acquisition device 34 approximately matches the X axis of the robot coordinate system.

(r2) The operator recognizes that a reference plane $S_0$ (i.e., a plane of which the position in the X-axis direction with respect to the image acquisition device 34 is constant) perpendicular to the optical axis at a predetermined distance (e.g., about 15 cm) from the robot teaching device 30 is a plane serving as a reference for arranging the hand at the start of gesture input.

FIG. 9 illustrates the positional relationship among an imaging plane 34$a$ of an image sensor and the lens 34$b$ of the image acquisition device 34, and the reference plane $S_0$ under the conditions (r1) and (r2). From the conditions (r1) and (r2), the respective positions $P_0$ and $P_1$ each corresponding to the imaging plane 34$a$ and the reference plane $S_0$ in the X-axis direction of the robot coordinate system are known. In this arrangement relation, the size (image magnification) of the image of the hand on the imaging plane 34$a$ when the hand is placed at the position of the reference plane $S_0$ is stored. When the operator's hand moves in the X-axis direction with respect to the reference plane $S_0$ in accordance with the gesture operation, and the size of the image of the hand on the imaging plane 34$a$ changes, the comparison with the size of the image of the hand when the hand is on the reference plane $S_0$ enables the position ($P_2$) of the hand in the X-axis direction to be determined based on the focal length of the lens 34$b$ and the imaging formula of a lens. Thus, in the case of the two-dimensional camera, three-dimensional position information of the movement trajectory of the hand can be acquired.

Since the three-dimensional position of the movement trajectory of the hand acquired as described above is the position information in a coordinate system fixed to the image acquisition device 34 (hereinafter referred to as a camera coordinate system), the trajectory detection section 311 converts the coordinate value of the movement trajectory into a coordinate value in the robot coordinate system based on information representing the relative positional relationship between the robot 10 and the image acquisition device 34 (the robot coordinate system and the camera coordinate system). The information representing the relative positional relationship between the robot 10 and the image acquisition device 34 may be acquired by the following method. For example, under the condition that the operator holds the robot teaching device 30 at a known position and posture (e.g., at a known position in the robot coordinate system and in a posture in which the optical axis of the lens of the image acquisition device 34 approximately matches the X axis of the robot coordinate system) in the robot coordinate system and performs a gesture input, the coordinate values of the movement trajectory can be converted from the camera coordinate system to the robot coordinate system. Alternatively, a sensor (a gyro sensor, acceleration sensor, etc.) for detecting the position/posture may be mounted on the robot teaching device 30. In this case, for example, the relative positional relationship between the robot coordinate system and the camera coordinate system is calibrated when the robot teaching device 30 is started, and the position and posture of the robot teaching device 30 in the robot coordinate system are always calculated by the sensor. Other methods for determining the relative positional relationship between the robot coordinate system and the camera coordinate system may be used.

Next, the robot teaching device 30 (identification section 312) identifies whether the movement trajectory of the hand represents a linear movement or a rotational movement by using the movement trajectory of the hand acquired in step S12 (step S13). The identification here is performed using, for example, two-dimensional position information of the movement trajectory of the hand (for example, position information obtained when the movement trajectory is projected on a certain plane). Hough transformation is used to identify whether the movement trajectory of the hand is a linear movement. Specifically, whether the movement trajectory acquired in step S12 is a straight line or not is determined by the following procedure.

(E1) For each point ($x_0$, $y_0$) on the (x, y) plane that represents the movement trajectory of the hand, a set of all the straight lines passing through the point is drawn on the (r, θ) plane using the relationship $r = x_0 \cos\theta + y_0 \sin\theta$.

(E2) The point where a plurality of curves intersect in the (r, θ) plane will represent a straight line in the (x, y) plane. Here, for example, when it is determined that a predetermined number or more pixels on the trajectory in the (x, y)

plane are on the same straight line, it may be determined that the movement trajectory of the hand is linear.

The generalized Hough transformation is used to identify whether the movement trajectory of the hand is a rotational movement. Specifically, the generalized Hough transformation can be used to determine whether the movement trajectory of the hand is in a shape of circular, elliptical, or a quadratic curve. As an example, it is possible to identify whether the movement trajectory is in a shape of circular by the following procedure.

(F1) For each point $(x_0, y_0)$ on the $(x, y)$ plane representing the movement trajectory of the hand, a set of all the circles passing through the point is drawn in $(A, B, R)$ space using the relation $(x_0-A)^2+(y_0-B)^2=R^2$.

(F2) A point shared by a plurality of curved surfaces in $(A, B, R)$ space represents a circle in the $(x, y)$ plane. Here, for example, when it is determined that a predetermined number or more of the pixels on the movement trajectory in the $(x, y)$ plane are on the same circle, it may be determined that the movement trajectory of the hand is rotational. In a manner similar to the case of a circle, it can also be determined whether the movement trajectory is a rotational movement by determining whether pixels on the trajectory in the $(x, y)$ plane lie on the same ellipse or not, or on the same quadratic curve or not.

When it is determined that the linear movement has been identified by the above-described procedures (E1) and (E2) (S13: linear movement), the robot teaching device 30 (command generation section 313) generates a command for translating the arm tip 11 and transmits the command to the robot controller 20 (step S14). The robot controller 20 receiving the command of linear movement translates the arm tip 11 of the robot 10. As illustrated in FIG. 4, a movement path $A_2$ of the translation of the arm tip 11 is made parallel with the movement path $A_1$ in the robot coordinate system of the movement trajectory of the hand detected in step S12. The moving direction is determined according to the orientation of the palm recognized by a method described later. For example, when the palm is facing upward as illustrated in FIG. 4, the arm tip 11 is moved upward. As for the movement amount of the arm tip 11, a method (1) moving the arm tip 11 by a preset distance or (2) moving the arm by a distance corresponding to the length of the movement trajectory of the hand can be adopted. The movement speed may be a preset value for the robot 10.

When it is determined that the rotational movement has been identified by the above-described procedures (F1) and (F2) (S13: rotational movement), the robot teaching device 30 (command generation section 313) generates a command for rotationally moving the arm tip 11 and transmits the command to the robot controller 20 (step S14). The robot controller 20 receiving the command of rotational movement rotationally moves the arm tip 11 of the robot 10. As illustrated in FIG. 5, a rotation axis $R_1$ in the case of rotationally moving the arm tip 11 is in a direction parallel with the direction of a rotation axis $R_0$ of the rotational movement of the hand in the robot coordinate system. The rotation direction $C_2$ of the arm tip 11 can be aligned with the rotation direction $C_1$ in the movement trajectory of the hand. As an example, the identification section 312 can determine the rotation axis $R_0$ of the movement trajectory of the hand in the robot coordinate system based on the three-dimensional movement trajectory of the hand acquired in step S12.

When neither a linear movement nor a rotational movement is detected (S13: identification impossible), the process ends without operating the robot 10.

Figure 7:
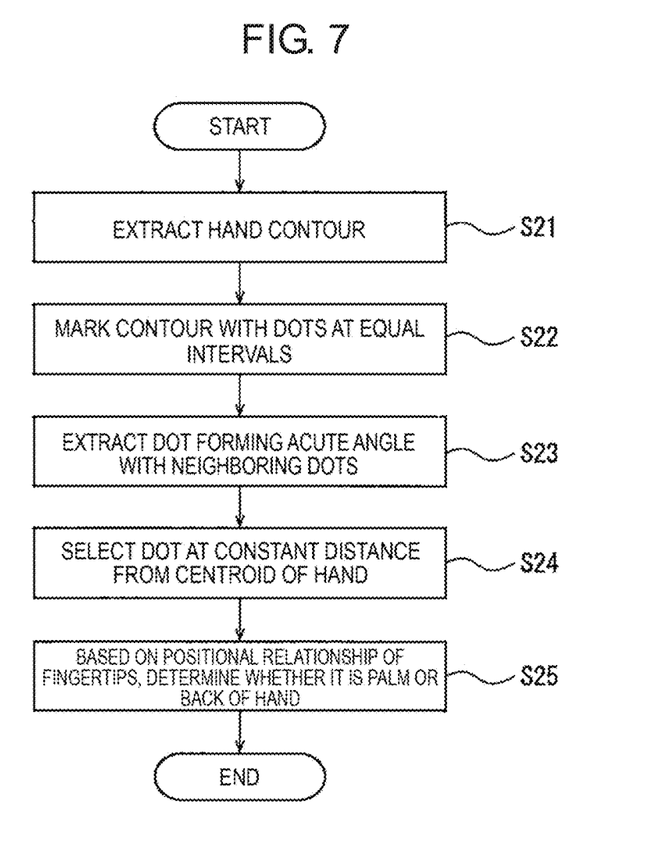
FIG. 7 is a flowchart illustrating a palm orientation recognition process.

Next, recognition of the orientation of the palm executed in step S11 will be described. FIG. 7 is a flowchart illustrating a process for recognizing the orientation of the palm (hereinafter, referred to as a palm orientation recognition process). When the palm orientation recognition process is executed, whether the hand used for the gesture is the right hand or the left hand and the posture of the hand at the time of the gesture are registered in advance in the robot teaching device 30. The posture of the hand used for the gesture is, for example, a posture in which the palm is open. First, the trajectory detection section 311 extracts the contour of the hand using a group of pixels of the hand detected in step S11 (step S21). Next, the trajectory detection section 311 marks the contour line of the hand with dots at equal intervals (step S22). Next, the trajectory detection section 311 sets line segments connecting adjacent dots among the dots set in step S22, and extracts a certain dot at which the angle formed by two line segments connecting the certain dot with adjacent dots on both sides of the certain dot is an acute angle of a constant value or less (step S23). Thus, a sharp portion such as a fingertip is extracted on the contour line.

Figure 8:
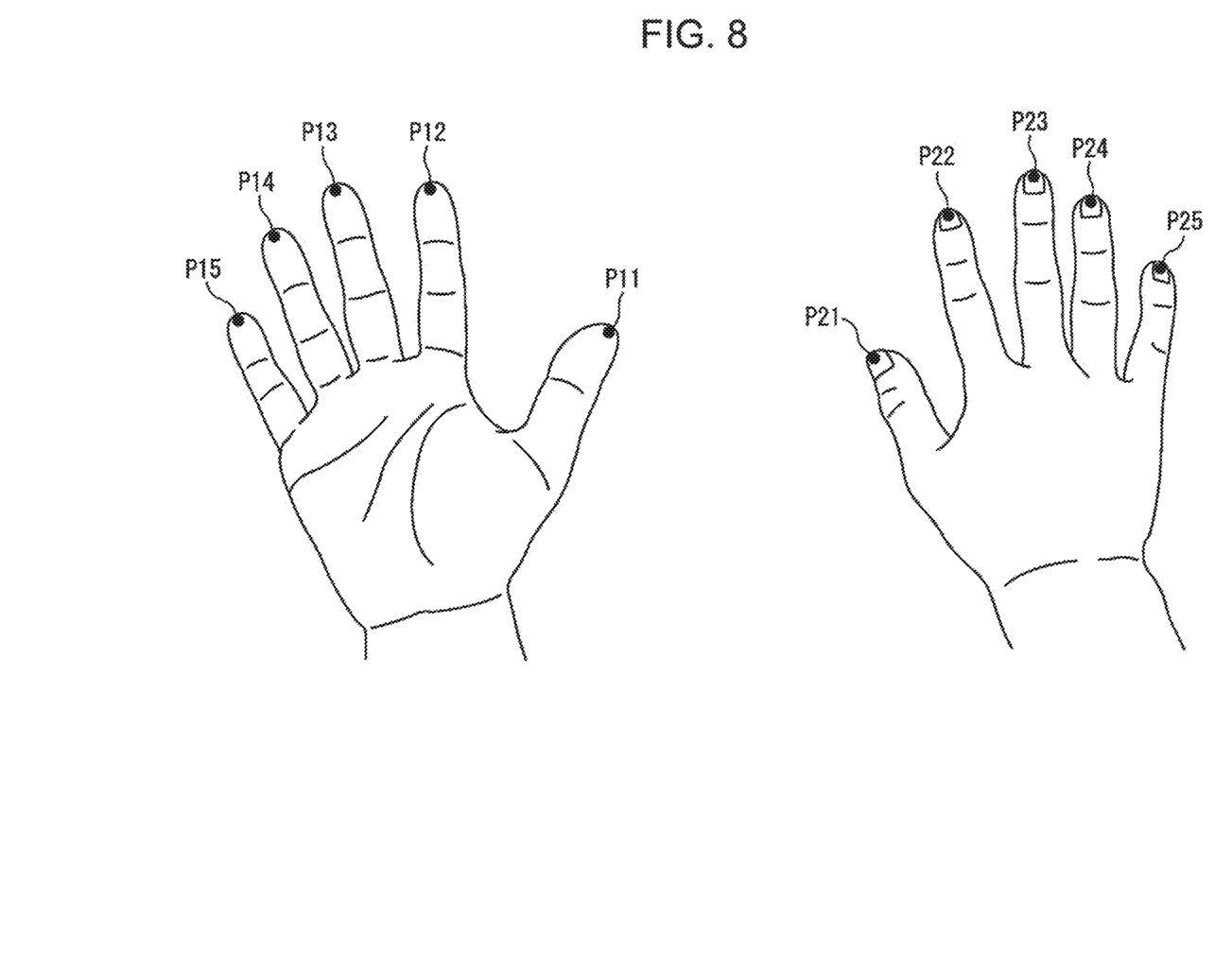
FIG. 8 is a schematic diagram illustrating a state in which the position of the fingertip is recognized by the palm orientation recognition process.

Next, from the dots extracted in step S23, the trajectory detection section 311 selects five dots having a constant distance from the centroid of the hand, and regards them as fingertip positions (step S24). The left side of FIG. 8 illustrates the fingertip positions P11 to P15 detected by the processing of steps S21 to S24 of FIG. 7 when the palm side of the right hand is facing the image acquisition device 34. Further, the right side of FIG. 8 illustrates the fingertip positions P21 to P25 detected by the processing of steps S21 to S24 of FIG. 7 when the back side of the right hand is facing the image acquisition device 34. By determining in advance whether the right hand or the left hand is used for gesture input, the orientation of the palm depicted in the image can be determined based on the fact that the positional relationship of the fingertips is different between the palm side and the back side of the hand as illustrated in FIG. 8 (step S25). For example, the palm or back of the hand may be determined according to the positions of the fingertips of the index finger, the middle finger, the ring finger, and the little finger that are relatively close to each other, and whether the thumb is located on the left or right side of the fingertips of the index finger, the middle finger, the ring finger, and the little finger.

Next, the timing of starting and ending the recognition of the gesture will be described. In order to avoid recognition of an unintended movement of the hand as a gesture instruction by the operator, for example, it is possible to adopt a method of detecting a movement trajectory of the hand at a fixed time interval and not identifying whether the movement is a linear movement or a rotational movement when the movement amount is less than a fixed amount. For example, the gesture teaching process of FIG. 6 may be repeatedly started at fixed time intervals, and it may be determined that identification is impossible when the movement amount of the movement trajectory of the hand identified as the linear movement or the rotational movement by the Hough transformation in step S13 is equal to or less than a fixed amount. In this way, it is possible to avoid recognition of hand movements that are not intended by the operator as gesture instructions. Further, for example, when the fingertip cannot be recognized in the recognition of the orientation of the palm in step S11, it may be determined that recognition is impossible in step S13.

As described above, according to the present embodiment, it is possible to teach the robot with a higher degree of freedom and an intuitive operation.

While the present disclosure has been described with reference to specific embodiments, it will be understood, by those skilled in the art, that various changes or modifications may be made thereto without departing from the scope of the following claims.

In the above-described embodiments, the functional blocks of the trajectory detection section 311, the identification section 312, and the command generation section 313 are disposed in the robot teaching device 30, but at least a part of these functions may be disposed on the robot controller 20 side.

The robot teaching device 30 may include both a distance image camera and a two-dimensional camera as the image acquisition device 34. In this case, the distance image camera and the two-dimensional camera are arranged so that their positional relationship (i.e., the relationship between the pixel arrangements of the images of the both cameras) is known. In such a configuration, the various recognition methods in the case of using the distance image camera and the various recognition methods in the case of using the two-dimensional camera, in the above embodiments, can be used together.

The program for executing the gesture teaching process and the palm orientation recognition process according to the above-described embodiments can be recorded on various kinds of computer-readable recording media (e.g., semiconductor memories such as ROM, EEPROM, flash memory, magnetic recording media, or optical disks such as CD-ROM and DVD-ROM).

The invention claimed is:

1. A robot teaching device configured to teach a robot, the robot teaching device comprising:
   an image acquisition device configured to acquire, as a moving image, a distance image representing distance information of an imaging object, or a two-dimensional image of the imaging object;
   a trajectory detection section configured to detect a movement trajectory of an operator's hand depicted as the imaging object in the moving image by using the moving image;
   an identification section configured to identify whether the detected movement trajectory represents a linear movement or a rotational movement; and
   a command generation section configured to output a command for translating a predetermined movable part of the robot based on the movement trajectory when the movement trajectory is identified as representing the linear movement, and to output a command for rotating the predetermined movable part of the robot based on the movement trajectory when the movement trajectory is identified as representing the rotational movement.

2. The robot teaching device according to claim 1, wherein
   the trajectory detection section detects the movement trajectory as coordinate values in a robot coordinate system based on information representing a relative positional relationship between the robot and the image acquisition device, and
   the command generation section generates the command for moving the predetermined movable part in parallel with the movement trajectory when the movement trajectory is identified by the identification section as representing the linear movement.

3. The robot teaching device according to claim 1, wherein
   the trajectory detection section further detects an orientation of a palm of the hand based on the moving image, and
   the command generation section sets a moving direction when the predetermined movable part is translated, according to the detected orientation of the palm.

4. The robot teaching device according to claim 1, wherein
   the identification section further detects a rotation axis of the rotational movement of the hand as coordinate values in a robot coordinate system when the movement trajectory is identified as representing the rotational movement, and
   the command generation section sets a rotation axis for rotationally moving the predetermined movable part, so as to be parallel with the rotation axis of the detected rotational movement of the hand.

5. A robot system, comprising:
   a robot;
   a robot controller configured to control the robot; and
   the robot teaching device according to claim 1, wherein
   the robot controller controls the robot based on the command output by the command generation section of the robot teaching device.

* * * * *